US012263617B2

(12) United States Patent
Edwall et al.

(10) Patent No.: US 12,263,617 B2
(45) Date of Patent: *Apr. 1, 2025

(54) BLENDING APPARATUS FOR MANUFACTURED WOOD PROCESSING

(71) Applicant: LOUISIANA-PACIFIC CORPORATION, Nashville, TN (US)

(72) Inventors: David Edwall, Hayward, WI (US); Shane Chucka, Springbrook, WI (US); Grant Stevenson, Hayward, WI (US); Mathew Fish, Hayward, WI (US); Wayne Temple, Shell Lake, WI (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,019

(22) Filed: Dec. 5, 2023

(65) Prior Publication Data

US 2024/0100734 A1 Mar. 28, 2024

Related U.S. Application Data

(63) Continuation of application No. 16/724,968, filed on Dec. 23, 2019, now Pat. No. 11,833,711.

(Continued)

(51) Int. Cl.

*B27N 1/02* (2006.01)
*B01F 29/60* (2022.01)

(Continued)

(52) U.S. Cl.

CPC ............ *B27N 1/0218* (2013.01); *B01F 29/61* (2022.01); *B01F 29/63* (2022.01); *B27N 1/0263* (2013.01);

(Continued)

(58) Field of Classification Search

CPC .... B27N 1/0218; B01F 29/63; B01F 29/4031; B01F 29/40221

(Continued)

(56) References Cited

U.S. PATENT DOCUMENTS

| | | | | | |
|---|---|---|---|---|---|
| 64,210 | A | * | 4/1867 | Emerson | B01F 29/63 366/228 |
| 1,293,570 | A | * | 2/1919 | Stevens | B01F 29/63 366/227 |
| 4,172,877 | A | * | 10/1979 | Schwaig | B01J 19/0066 165/169 |
| 4,188,130 | A | * | 2/1980 | Engels | B27N 1/0218 366/228 |

(Continued)

*Primary Examiner* — Marc C Howell

(74) *Attorney, Agent, or Firm* — Wayne Edward Ramage; Baker Donelson

(57) ABSTRACT

An improved blending apparatus for manufactured wood products with a rotating blending drum or cylinder with a pattern of alternating flights of different configurations extending from the interior of the drum. The flights lift the strands as the drum rotates to different heights before the strands free-fall back to the bottom of the drum. One flight is shorter, and may be trapezoidal in cross-section. The second flight is taller, and may have a "bull-nose" configuration with substantially vertical sides. During operation, the design of the bull-nose flight tends to hold more strands and to carry them closer to the top of the drum before the strands drop and fall. In contrast, the shorter height and angled sides of the trapezoidal flight tends to hold fewer strands and to not carry them as high along the side before strands drop and fall. The alternating pattern causes a more consistent and dispersed fall of strands as the drum rotates, resulting in a significantly larger and more consistent amount of the sprayed adhesives and waxes being applied to the strands, and not passing through gaps to build up on the drum wall.

15 Claims, 4 Drawing Sheets

Related U.S. Application Data

(60) Provisional application No. 62/784,524, filed on Dec. 23, 2018.

(51) Int. Cl.
*B01F 29/63* (2022.01)
*B01F 29/00* (2022.01)

(52) U.S. Cl.
CPC ..... *B01F 29/40221* (2022.01); *B01F 29/4031* (2022.01)

(58) Field of Classification Search
USPC .......................................................... 366/225
See application file for complete search history.

(56) References Cited

U.S. PATENT DOCUMENTS

| | | | | | |
|---|---|---|---|---|---|
| 4,289,279 | A * | 9/1981 | Brandt | B02C 17/225 241/102 |
| 4,402,465 | A * | 9/1983 | Persson | B02C 17/225 241/183 |
| 2006/0016564 | A1 * | 1/2006 | Holzer | B27N 1/0218 118/317 |
| 2006/0141108 | A1 * | 6/2006 | Tene | A22C 9/005 426/281 |
| 2010/0302898 | A1 * | 12/2010 | Tolle | F28D 7/106 366/147 |

* cited by examiner

BLENDING APPARATUS FOR MANUFACTURED WOOD PROCESSING

This application is a continuation of U.S. patent application Ser. No. 16/724,968, filed Dec. 23, 2019, which claims benefit of and priority to U.S. Provisional Application No. 62/784,524, filed Dec. 23, 2018. U.S. Provisional Application No. 62/784,524 and U.S. patent application Ser. No. 16/724,968 are incorporated herein by specific reference in their entireties, including the specifications, drawings and complete disclosures, for all purposes.

FIELD OF INVENTION

This invention relates to an improved blending apparatus for manufacturing engineered or composite wood products (e.g., OSB, oriented strand board).

BACKGROUND OF THE INVENTION

An early step in the manufactured wood process is the blending of wood strands with a variety of additives prior to mat formation and pressing. The blending typically occurs in a blending drum that rotates. However, a continuing problem in prior art blending processes is an uneven distribution and application of additives to the wood strands as they pass through the blending drum, resulting in inconsistent additive coverage of the wood strands. In addition, wood strands can vary in size, and strands that are wider or longer can curl or fold, also leading to inconsistent or spotty additive coverage.

SUMMARY OF THE INVENTION

In various exemplary embodiments, the present invention comprises an improved blending apparatus that overcomes the inconsistent and partial additive coverage and application to wood strands in the blending process. The improved blending apparatus comprises a rotating blending drum with a pattern of alternating flights of different configurations extending from the interior of the drum. The blending drum comprises a hollow horizontal cylinder that mixes the raw materials (e.g., wood strands) in the interior for producing the product. A header or pipe extends lengthwise in the interior that holds adhesive and/or wax applicators that spray adhesive and/or wax on the strands. On the interior wall of the cylinder are “flights” that lift the strands as the cylinder rotates until the strands come close to the top of the blender, where they free-fall back to the bottom of the blender. The strands are exposed to adhesive and wax as they fall.

The flight pattern disclosed herein has surprisingly resulted in a significant reduction in the build up from the overspray of adhesive and wax on the blender walls. It also has shown a positive effect in reducing the surging of strands as they pass through the blender.

In one embodiment two different designs of flights are used: a trapezoidal flight, and a bull-nose flight, in cross-section. The trapezoidal flight has a wider base, angled sides, and a broader flat top than the bull-nose flight. The bull-nose flight has substantially vertical sides, an angled top with a flat top, and is substantially taller than the trapezoid flight (in the example shown, the bull-nose flight is approximately twice as tall as the trapezoidal flight). Each flight extends all or substantially all of the length of the blender drum on the interior, generally parallel to the longitudinal axis. The flights alternate between trapezoidal and bull-nose.

During operation, the design of the bull-nose flight tends to hold more strands and to carry them closer to the top of the drum before the strands (or a majority thereof) drop and fall. In contrast, the shorter height and angled sides of the trapezoidal flight tends to hold fewer strands and to not carry them as high along the side before strands drop and fall. The alternating pattern causes a more consistent and dispersed fall of strands as the drum rotates, instead of batches of strands falling in sequence, leaving gaps therebetween. The more consistent and dispersed fall of strands results in a significantly larger amount of the sprayed adhesives and waxes being applied to the strands, and not passing through gaps to build up on the drum wall.

DETAILED DESCRIPTION OF EXEMPLARY EMBODIMENTS

Figure 1:
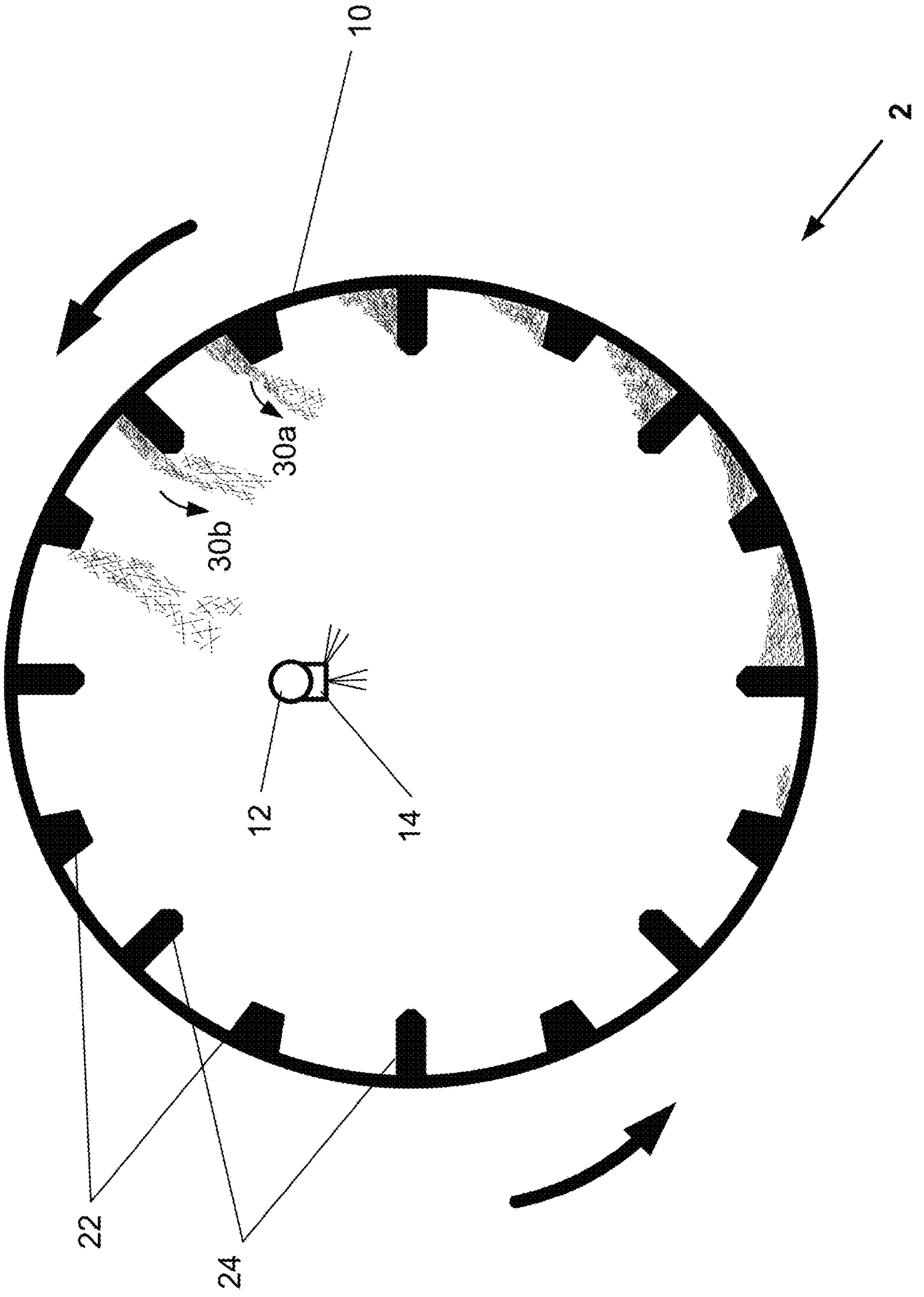
FIG. 1 shows a cross-sectional view of the improved blender flight configuration and arrangement in accordance with an embodiment of the present invention.

In various exemplary embodiments, the present invention comprises an improved blending apparatus that overcomes the inconsistent and partial additive coverage and application to wood strands in the blending process. As seen in FIG. 1, the improved blending apparatus comprises a rotating blending drum 2 with a pattern of alternating flights of different configurations 22, 24 extending from the interior of the drum.

In general, the blending drum comprise a hollow cylinder 10 in a generally horizontal arrangement (i.e., the longitudinal axis of the cylinder is horizontal or near-horizontal at an angle) that mixes the raw materials (e.g., wood strands) in the interior for producing the product (i.e., raw material covered or blended with various additives, adhesives, waxes, chemicals or other substances). A header or pipe 12 extends lengthwise in the interior, and comprises a plurality of applicators 14 mounted thereon or suspended therefrom. The applicators spray, discharge or spread adhesive and/or wax (or other additives, chemicals or substances) onto and into the wood strands or other raw material as the cylinder 10 rotates around its longitudinal axis. On the interior wall of the cylinder are “flights” 22, 24 that lift the wood strands along one side as the cylinder rotates until the wood strands come close to the top of the cylinder, where they free-fall back to the bottom of the rotating cylinder, and are lifted again. The strands are exposed to the sprayed adhesive and wax (and any other additives or substances) as they fall, and at least some of the sprayed material sticks to and covers the strands.

Figure 2:
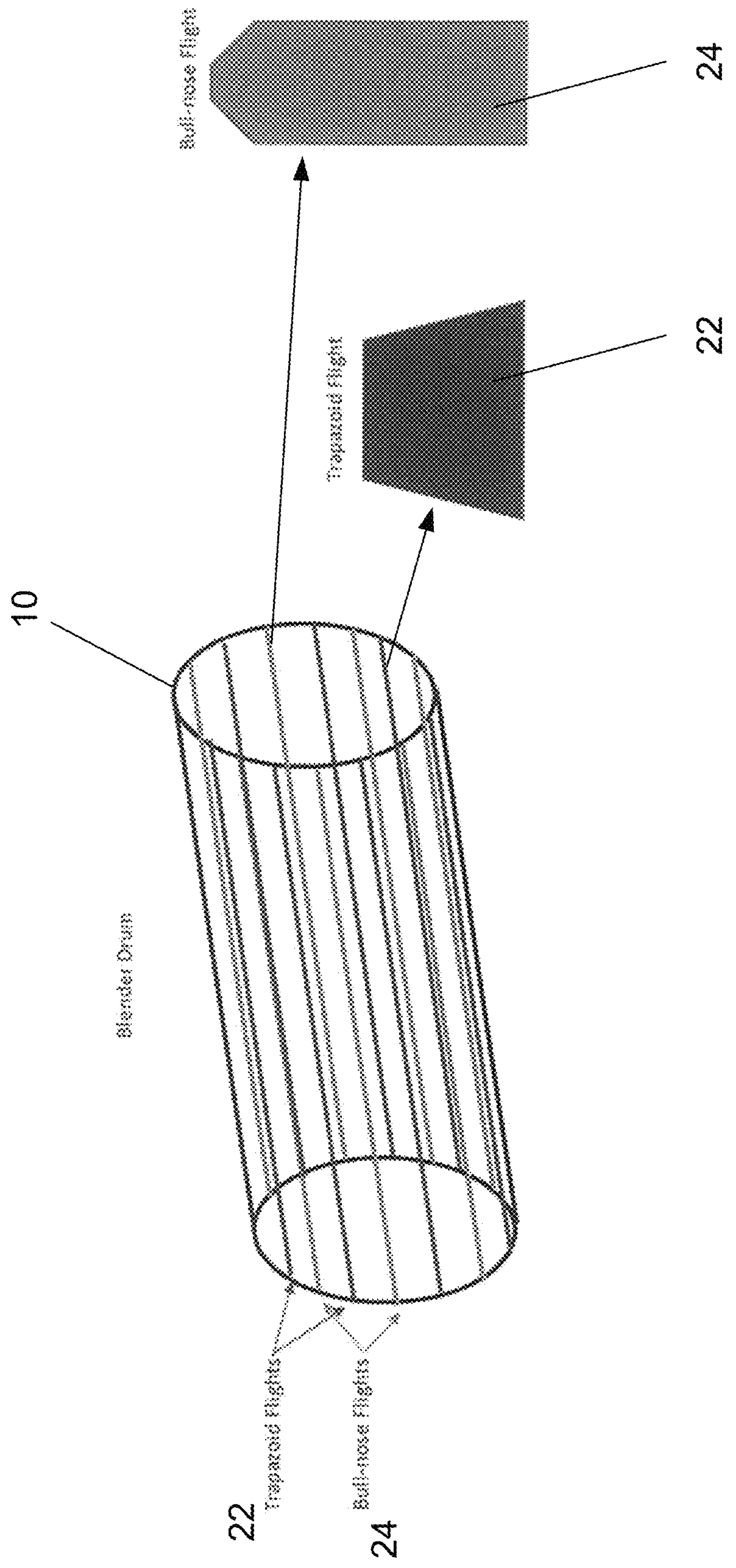
FIG. 2 shows another view of the blender flights of FIG. 1.

In several embodiments, the cylinder's 10 longitudinal axis is slanted at an angle, as seen in FIG. 2, so that the wood strands gradually move progressively downward through the cylinder to the lower end as it rotates. This arrangement helps prevent clumping of the strands in any particular area, and makes it easier to remove treated strands from the lower end when the process is completed.

In prior art devices, when the adhesive and wax are sprayed, some adhesive and wax do not hit the strands, but instead build up as “overspray” on the header or the interior wall of the blender. The build-up can take a substantial amount of time to remove, and can affect the quality of the treated strands by leading to inconsistent and uneven application of the adhesive, wax or other additives or substances to the strands, which in turn can lead to the manufactured wood product itself (i.e., the board or panel made from the treated strands), being downgrade, with a concomitant reduction in product value.

The flight pattern disclosed herein has surprisingly resulted in a significant reduction in the build up from the overspray of adhesive and wax on the blender walls. It also has shown a positive effect in reducing the surging of strands as they pass through the blender, and thereby promoting a consistent and even passage of strands through the blender and a more consistent and even application of adhesive, wax or other additives or substances to the strands. This results in a higher quality of manufactured wood product.

In the embodiment shown in FIG. 1, two different designs of flights are used: a trapezoidal flight 22 and a bull-nose flight 22 (in cross-section). The trapezoidal flight has a wider base, angled sides (or at least one angled side), and a broader flat top than the bull-nose flight. The bull-nose flight has substantially vertical sides, an angled top with a flat top, and is substantially taller than the trapezoid flight. In the example shown, the bull-nose flight is approximately twice as tall as the trapezoidal flight, although the dimensions of each may vary depending on the size of the cylinder and the size and type of raw material being treated. Each flight extends all or substantially all of the length of the blender drum on the interior, generally parallel to the longitudinal axis, although a flight may be angled or curved so as to promote mixing or movement of the raw material.

In the embodiment shown, the flights alternate between the trapezoidal and bull-nose flights. Flights of the same type may be of the same size, or may vary is size (e.g., some bull-nose flights may be taller than other bull-nose flights in the same cylinder). The flights may be evenly spaced, as seen in FIG. 1, although the spacing between flights may differentially vary. In several embodiments, the spacing between adjacent flights is approximately 18 inches to 48 inches, preferably 24 inches to 36 inches, more preferably 28 to 32 inches. In alternative embodiments, different arrangements and sequences may be used, such as, but not limited to, a two trapezoidal flights and one bullnose flight sequence. In some embodiments, additional flight designs (such as a rectilinear flight, or rounded or semi-circular flight) beyond the trapezoidal and bull-nose flights may be used in combination with either or both.

During operation, the design of the bull-nose flight tends to hold more strands and to carry them closer to the top of the drum before the strands (or a majority thereof) drop and fall 30*b*. In contrast, the shorter height and angled sides of the trapezoidal flight tends to hold fewer strands and to not carry them as high along the side before strands drop and fall 30*a*. The alternating pattern or patterns causes a more consistent and dispersed fall of strands as the drum rotates, instead of batches or clumps of strands falling in sequence, leaving gaps therebetween. The more consistent and dispersed fall of strands results in a significantly larger amount of the sprayed adhesives and waxes being consistently and evenly applied to the strands, and not passing through gaps to build up on the drum wall.

Figure 3:
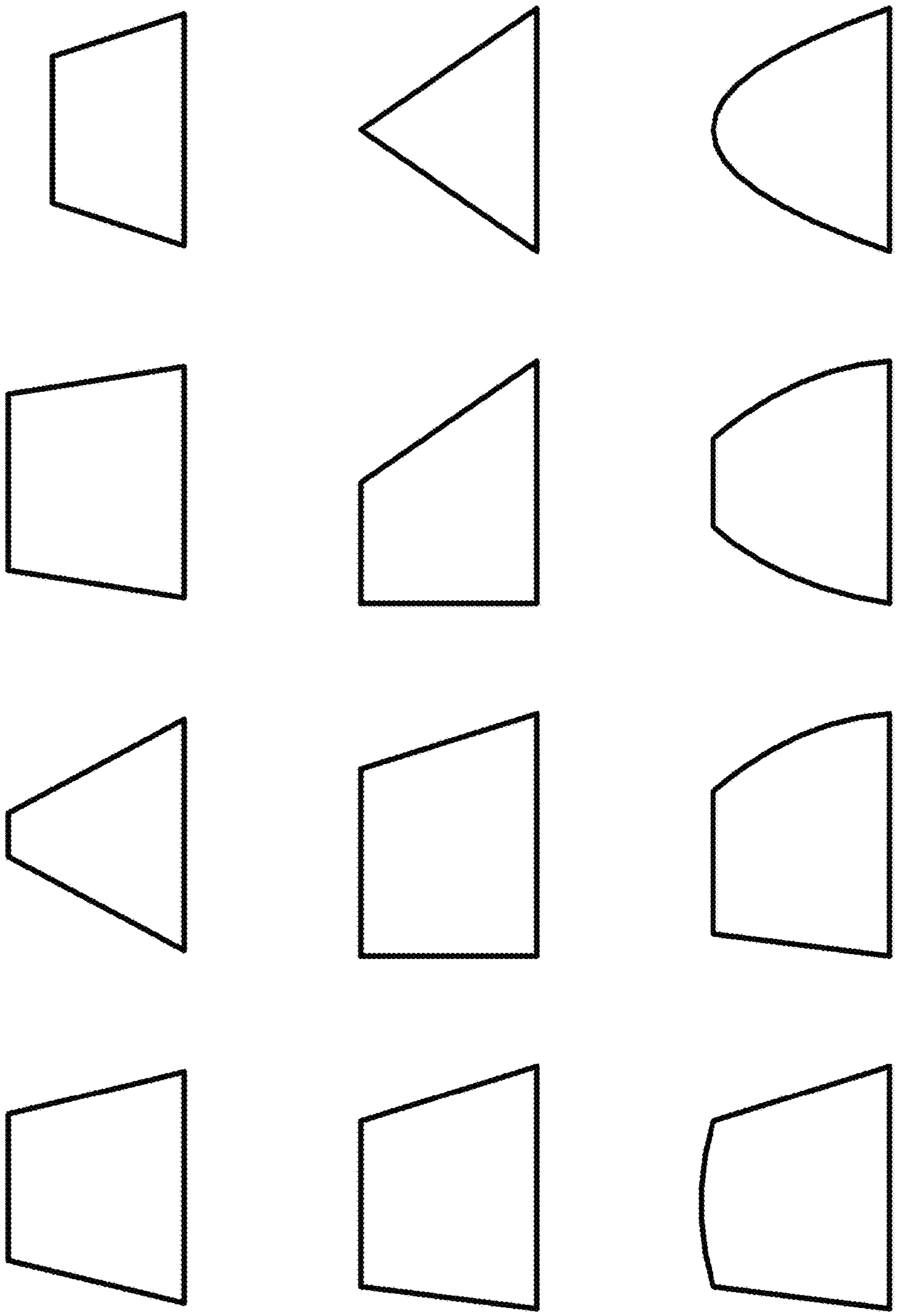
FIG. 3 shows cross-sectional views of alternative designs of a first type of blender flight.
Figure 4:
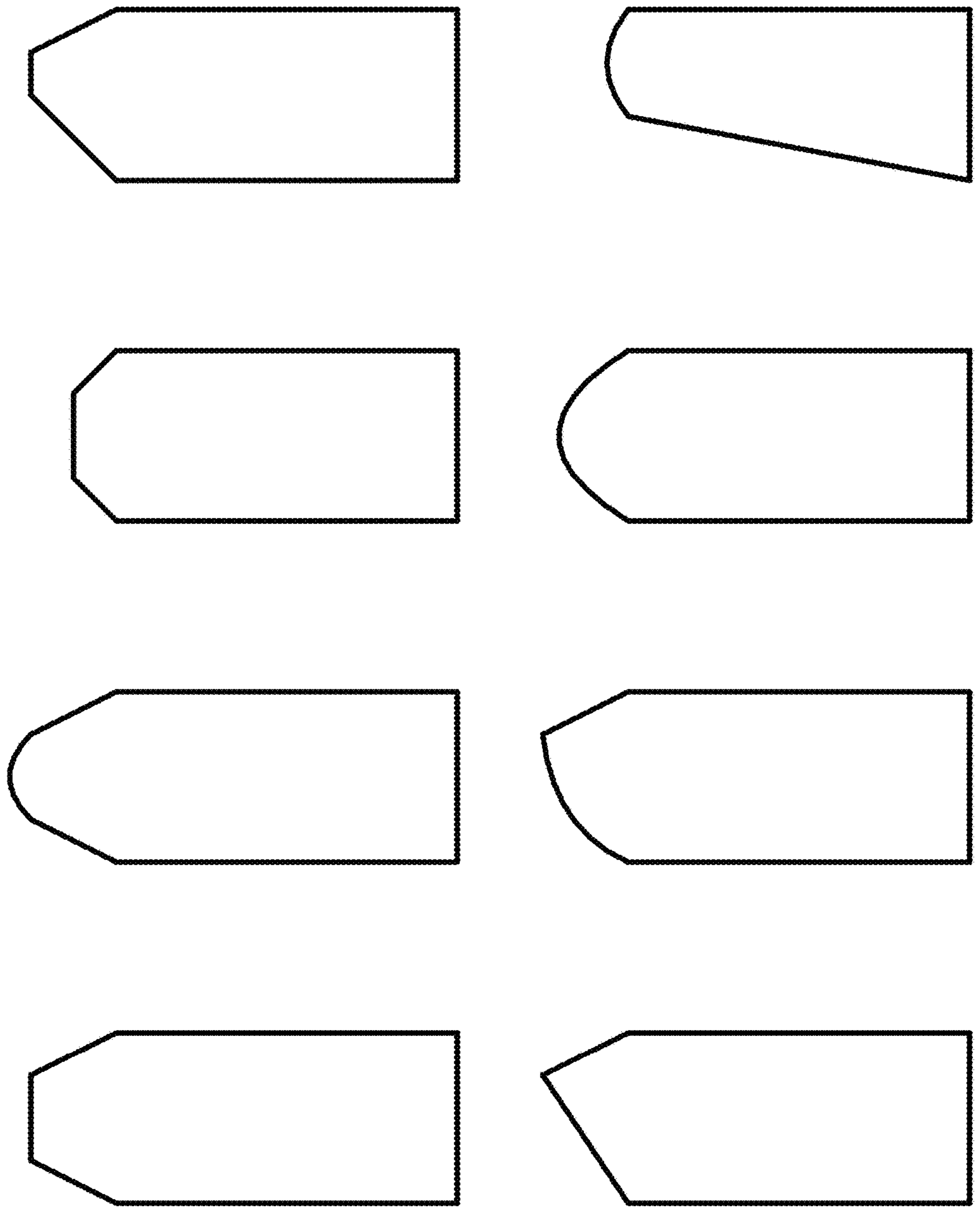
FIG. 4 shows cross-sectional views of alternative designs of a second type of blender flight.

A flight may be symmetric in cross section, so as to work equally well with a change in the direction of rotation of the cylinder. In some embodiments, a flight may be asymmetric in cross section, such that the leading edge or side (i.e., the edge or side of the flight that leads in the direction of rotation) has a different angle than the angle of the trailing edge or side, or some other shape, such as rounded or curved or triangular, or combinations thereof. Similarly, the top of the taller "bull-nose" flight may be trapezoidal with different angles, or some other shape, such as rounded or curved or triangular, or combinations thereof. Non-exclusive variations or alternative designs for the shorter flights are shown in FIG. 3, while non-exclusive variations or alternative designs for the shorter flights are shown in FIG. 4.

Additives include, but are not limited to, a sizing agent (e.g., wax, emulsion or slack wax), a resin (e.g., pMDI, MUF, MUPF, or PF), and/or a preservative (e.g., zinc borate).

An application of the improved blending apparatus is described in context of the manufacturing of an engineered wood composite as follows:

a. Woods strands or plies are dried and stored.
b. Designated strands or plies (e.g., bottom, core, top layers) are blended with applicable additives in the improved blending apparatus described above.
c. Three or more layers of treated strands or plies (typically with moisture content of 2 to 10%) are formed as a mat, each layer being oriented.
d. Strands or plies may or may not be covered with a fine layer of wood particles. The fine layer typically weighs between 0.05 to 0.40 lbs/cubic foot, and may be treated with a sizing agent (e.g., wax, emulsion or slack wax), a resin (e.g., pMDI, MUF, MUPF, or PF), and/or a preservative (e.g., zinc borate).
e. The mat is pressed in a high pressure, high temperature press to consolidate the mat into a board or panel of desired or targeted thickness.
f. After a period of time (typically not more than 14 days), the board/panel may or may not be processed through a sander (i.e., to remove some imperfections on a top or bottom surface, reduce thickness variations in the panel, or to machine a tongue and groove for installation).
g. The panel usually undergoes additional finishing (e.g., panels cut to size; an edge seal or primer is applied to the panel, typically in a unit or stack of panels, by automatic or hand sprayers; and final packaging) to produce the finished product.

The present invention thus provides an improved, higher quality OSB or engineered/manufactured wood composite panel through the improved blending process introduced in-line in the manufacturing process, with an increase in performance and efficiency and reduction in cost and wasted additives (i.e., waxes, adhesives and substances that are not applied to the raw material). Further, the present invention promotes a smoother flow of the wood furnish through the blender, and assists with the reduction of build-up on the blender walls, both of which reduce down-time, increase performance and efficiency of the blender operation, and reduces costs.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A blending apparatus for treatment of raw material for manufactured wood products with one or more additives or substances during the manufacturing process, comprising:

a rotatable drum with a length and an interior wall;

a plurality of a first type of blender flight with a front side, a back side, and a top side extending from the interior wall of the drum, said first type of blender flight comprising a trapezoid in cross section, wherein the front side forms an obtuse angle with the tangent to the drum at the point of attachment to the interior wall, wherein the back side forms an obtuse angle with the tangent to the drum at the point of attachment to the interior wall; and a plurality of a second type of blender flight with a front side, a back side, and a top side extending from the interior of the drum, said second type of blender flight comprising a bull-nose in cross-section, wherein the back side is parallel to the front side, and the top side comprises at least one point;

wherein during rotation of the drum, the first type of blender flight is configured to differentially release the raw material in comparison to the second type of blender flight.

2. The apparatus of claim 1, wherein the first type and second type of blender flights extend in parallel for some or all of the length of the rotatable drum.

3. The apparatus of claim 1, wherein the first type of blender flight alternates with the second type of blender flight.

4. The apparatus of claim 2, wherein the blender flights are evenly spaced around the interior wall.

5. The apparatus of claim 2, wherein blender flights are differentially spaced from adjacent blender flights.

6. The apparatus of claim 1, wherein the second type of blender flight is taller in height and extends further from the interior wall than the first type of blender flight.

7. The apparatus of claim 1, wherein the first type of blender flight carries the raw material to a lower height as the drum rotates and allows the raw material to drop and fall earlier in comparison to the second type of blender flight.

8. The apparatus of claim 7, wherein the different heights and cross-sections of said first type of blender flight and said second type of blender flight are adapted to cause greater dispersion of raw material as it falls within the drum.

9. The apparatus of claim 8, wherein greater dispersion of raw material as it falls results in a larger and more consistent amount of one or more additives or substances being applied to the raw material.

10. The apparatus of claim 9, wherein the additives or substances comprise wax and adhesives, and the raw material comprises wood strands or flakes.

11. The apparatus of claim 1, wherein the blender flights are arranged in a repeated sequence of three rows, wherein a first row comprises the first type of blender flight, a second row comprises the first type of blender flight, and a third row comprises the second type of blender flight.

12. The apparatus of claim 1, further comprising a plurality of a third type of blender flight with a front side, a back side, and a top side extending from the interior wall of the drum, said third type of blender flight having a different cross-section than the first type of blender flight.

13. The apparatus of claim 1, further comprising a plurality of a third type of blender flight with a front side, a back side, and a top side extending from the interior wall of the drum, said third type of blender flight having a different cross-section than the first type of blender flight and the second type of blender flight.

14. The apparatus of claim 12, wherein the third type of blender flight is rectilinear in cross section.

15. The apparatus of claim 12, wherein the third type of blender flight is rounded in cross section.

* * * * *